United States Patent [19]

Barry

[11] Patent Number: 4,714,108

[45] Date of Patent: Dec. 22, 1987

[54] HEAT PUMP SYSTEM

[75] Inventor: John J. Barry, Erie, Pa.

[73] Assignee: Pyramid Industries, Inc., Erie, Pa.

[21] Appl. No.: 897,322

[22] Filed: Aug. 18, 1986

Related U.S. Application Data

[63] Continuation-in-part of Ser. No. 732,963, May 13, 1985, abandoned.

[51] Int. Cl.[4] .............................................. F28D 7/12
[52] U.S. Cl. ........................................ 165/45; 165/142
[58] Field of Search .................................... 165/45, 142

[56] References Cited

U.S. PATENT DOCUMENTS

| | | | |
|---|---|---|---|
| 492,366 | 2/1893 | Reed | 165/142 |
| 1,835,323 | 12/1931 | Olson et al. | 165/142 |
| 2,376,373 | 5/1945 | Merckel | 165/142 |
| 4,052,857 | 10/1977 | Altschuler | 60/641.2 |
| 4,111,258 | 9/1978 | Jahns et al. | 165/142 X |
| 4,512,156 | 4/1985 | Nagase | 165/45 |

Primary Examiner—Allen M. Ostrager
Attorney, Agent, or Firm—Charles L. Lovercheck; Wayne L. Lovercheck; Dale R. Lovercheck

[57] ABSTRACT

A heat pump system is disclosed which includes a pipe having a circular cross sectional shape and a diametrically disposed partition dividing the circular cross sectional shape into two semi-circular flow passages. Each flow passage having an area equal to the cross sectional area of the hole through a one inch diameter pipe. The two flow channels are connected together by a return means at their second end and one of the flow passages at the first end is connected to a pump which directs the fluid into a heat exchanger and a return passage is provided for the fluid from the heat exchanger to the second flow passage in the pipe. The pipe is disclosed in a medium like liquid or soil or the like and heat is absorbed by the fluid flowing through the flow channels which is circulated by a pump and transferred to a second medium by heat exchanger.

1 Claim, 7 Drawing Figures

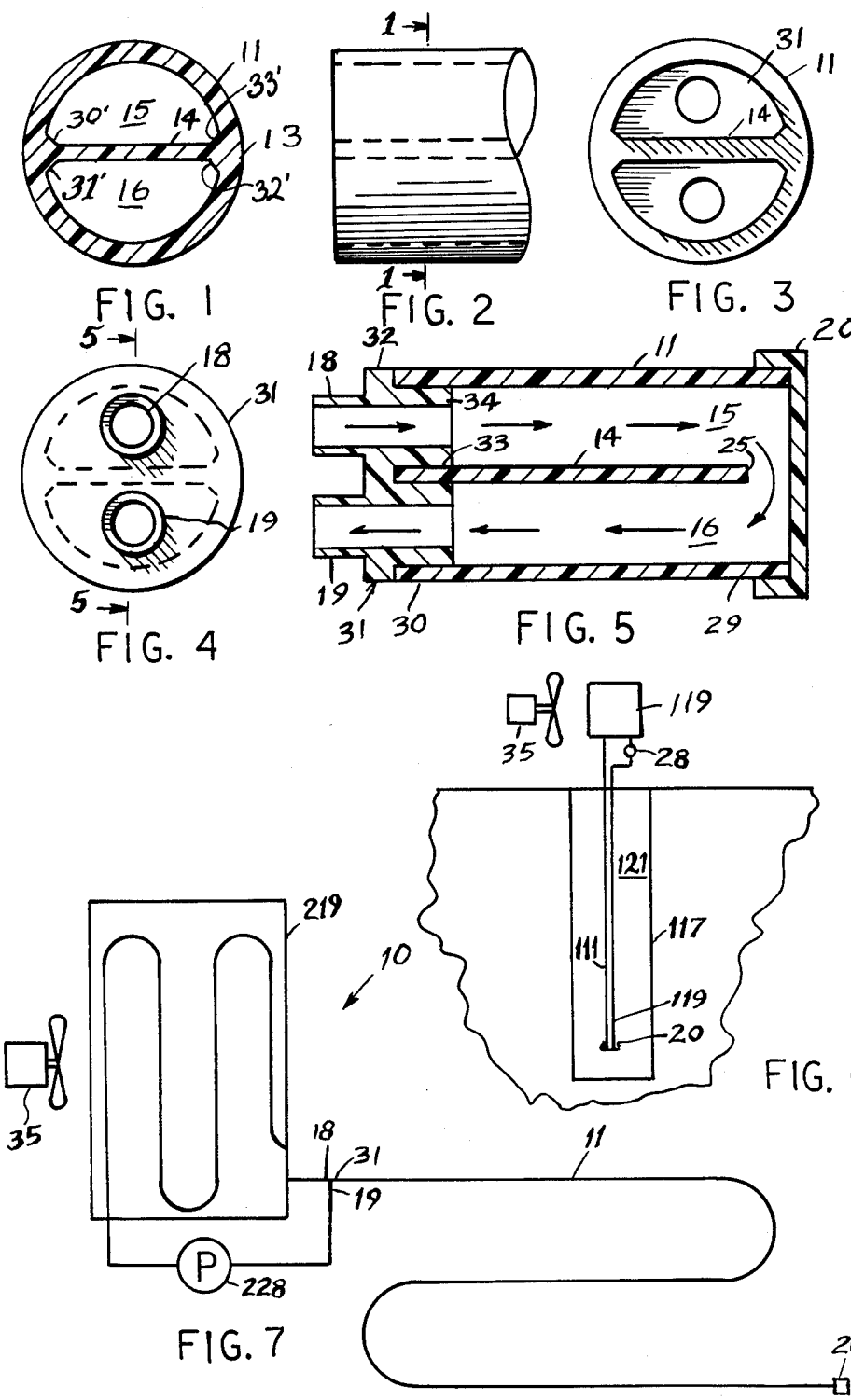

HEAT PUMP SYSTEM

REFERENCE TO PRIOR APPLICATION

This is a continuation-in-part of application Ser. No. 732,963, filed May 13, 1985, now abandoned.

REFERENCE TO PRIOR ART

Prior heat exchangers used separate tubes for the outgoing line and the return line. This required additional material and more complex structures.

U.S. Pat. No. 3,110,750 shows a round enclosure having two diametrically separated conduit which is used in an electrical conduit system. This conduit could not be used as disclosed for use as a heat transfer duct combination such as Applicant claims.

U.S. Pat. Nos. 3,567,134, 3,625,258 and U.S. Pat. No. 2,196,708 likewise show conduits of the general type shown in this application.

STATEMENT OF THE INVENTION

A heat pump and heat transfer combination is disclosed using a circular pipe divided into two flow channels by a diametrically disposed partition. The pipe may be immersed in a warm medium and fluid may be re-circulated through one flow channel and back through the other to a heat exchanger so that heat is transferred from the warm heat medium to the fluid in the flow channel and hence can be used by the use heat exchanger. It has been discovered that the size of a well required to transfer a given amount of heat can be reduced from six inches to four inches for a given quantity of heat transfer by using the pipe according to the present invention instead of using two separate round pipes for the flow in a closed path. It has also been discovered that round pipe with two flow channels will fit efficiently into a round well or a round duct.

OBJECTS OF THE INVENTION

It is an object of the invention to provide in combination with a heat exchanger an improved pipe conduit.

It is another object of the invention is to provide a conduit and heat exchanger combination that is simple in construction, economical to manufacture and simple and efficient to use.

Another object of the invention is to provide an improved pipe.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING

FIG. 1 is a cross sectional view taken on line 1—1 of FIG. 2.

FIG. 2 is a partial side view of a pipe according to the invention.

FIG. 3 is an end view of FIG. 5 with the cap removed.

FIG. 4 is a left end view of FIG. 5.

FIG. 5 is a longitudinal cross sectional view taken on line 5—5 of FIG. 4.

FIG. 6 is a diagramatic view of the pipe according to the invention shown in a well.

FIG. 7 is a diagramatic view of the pipe according to the invention shown connected to a heat exchanger.

DETAILED DESCRIPTION OF THE DRAWING

Now with more particular reference to the drawing, the heat transfer pipe 11 has a central portion 14 that extends from one end thereof to the other. The central partition 14 has radius ends or fillets 30', 31', 32' and 33' connecting said central partition 14 to the inner periphery 13 of said pipe 11. The central partition 14 is notched at 25 adjacent end cap 20 to provide a flow path from channel 15 to channel 16 around the end of the central partition 14 between the central partition 14 and the end cap 20 to channel 16. The end cap 20 could have a flow passage molded in it to avoid notching the partition. The end cap 20 is a simple cup-shaped cap having a flange that fits over the second end 29 of the pipe 11 and may be cemented in place by a suitable cementing material compatible with the material from which the pipe is made. Pipe 11 may be extruded from a suitable thermoplastic material and end plug and cap can be made of a similar material.

The first end 30 of the heat transfer pipe 11 receives the plug 31. Plug 31 has a cylindrical body 34 that fits into first end 30 of pipe 11. Two nipples 18 and 19 are integrally molded to the body 34 of plug 31. A radially outwardly directed flange 32 overlies the first end 30 of the heat transfer pipe 11. A diametrically extending slot 33 is molded in the body 34 of the plug 31. Slot 33 receives an end of partition 14. The plug 31 fits into the heat transfer pipe 11 snugly with the flange 32 overlying the end 30 of the heat transfer pipe 11 and the plug 31 may be cemented in place. Suitable hoses may be supported on the nipples 18 and 19 for connecting the hoses to a heat exchanger or the like.

A circulating fan 35 may be supported on the heat exchanger 119 and directs air through the heat exchanger 119 in a manner familiar to those skilled in the art.

In the embodiment of FIG. 6, a pipe 111, similar to pipe 11, is supported in a well 117. The well 117 may provide a source of water from which heat is to be directed to heat exchanger 119. The pipe 111 has cap 20 on its lower end. Pump 28 circulates water 121 through pipe 111 and through heat exchanger 119. Fan 35 will circulate air through heat exchanger 119 to the ambient air thus removing heat from the water 121 in well 117.

The embodiment of FIG. 7 shows a pipe 11 that could be buried in the ground to supply heat to the ambient air by means of heat exchanger 219. Pump 228 circulates water through pipe 11 which has a partition, end cap 20 and plug 31 similar to those of FIG. 5 and flow channels similar to the flow channels 15 and 16 of FIG. 5. Fan 35 directs air through heat exchanger 219 in a conventional manner.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An apparatus for using heat from a first subterranean fluid or the like for heating a second fluid comprising:
- an elongated pipe generally circular in cross-section having a first end, a second end and a length sufficient to permit said pipe to extend into the earth, into contact with fluid in said earth,
- a heat exchanger having a coil therein,
- said coil being connected to said pipe,
- said pipe having a diametrically disposed partition integrally attached to the inside wall of said pipe and having fillet corners at each side with said partition at the junctures of said partition and said pipe,
- said partition extending from said first end to a position closely adjacent said second end, providing a first flow channel and a second flow channel,
- a closure closing said second end providing communication between said first flow channel and said second flow channel,
- a plug closing said first end,
- said plug having a cylindrical body with a first hole and a second hole,
- said first hole is spaced from said second hole and extends therethrough and a diametrically extending slot is dispsoed in one side thereof,
- said plug being received in said first end of said pipe with an end of said partition received in said slot whereby a flow path is provided from said first hole through said first flow channel through said second flow channel to said second hole,
- a first nipple is molded to said plug communicating with said first hole,
- a second nipple is molded to said plug overlying said second hole providing connection to said holes,
- said pipe being connected to said nipples and to said heat exchanger,
- said pipe being disposed in a well containing first fluid for pumping heat from said first fluid to said second fluid,
- a pump being connected in series with one said nipple for circulating water through said pipe and through said heat exchanger.

* * * * *